J. W. Gardner,
Attaching Handles to Cutlery.
No. 37,225. Patented Dec. 23, 1862.

Witnesses:
H. O. Coombs
G. W. Reed

Inventor:
J. W. Gardner
by Munn & Co
attys

UNITED STATES PATENT OFFICE.

J. W. GARDNER, OF SHELBURNE FALLS, MASSACHUSETTS.

IMPROVEMENT IN ATTACHING HANDLES TO CUTLERY.

Specification forming part of Letters Patent No. 37,225, dated December 23, 1862.

*To all whom it may concern:*

Be it known that I, J. W. GARDNER, of Shelburne Falls, in the county of Franklin and State of Massachusetts, have invented a new and useful improvement in attaching handles to cutlery and implements pertaining or analogous thereto; and I do hereby declare that the following is a full, clear, and exact description of the same, reference being had to the accompanying drawings, making a part of this specification, in which—

Figure 1:
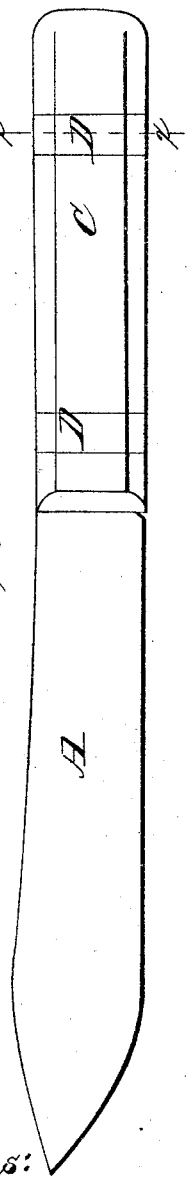
Figure 3:
Figure 4:
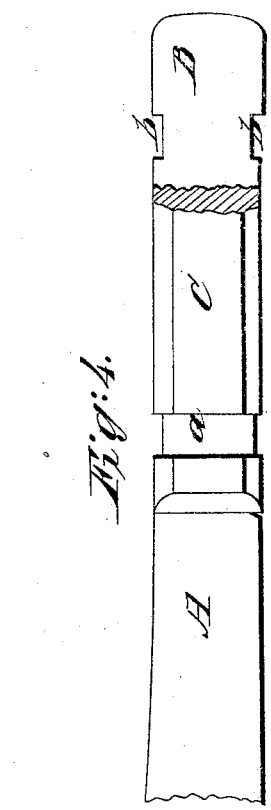
Figure 2:
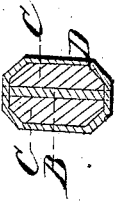

Figure 1 is a side view of a knife with its handle attached to it according to my invention. Fig. 2 is a transverse section of the same, taken in the line $x\ x$, Fig. 1. Fig. 3 is an edge view of the same. Fig. 4 is a side view of the same, partly in section, and the parts not secured in position.

Similar letters of reference indicate corresponding parts in the several figures.

This invention consists in having the implement provided with a flat tang and the handle formed of two parts, placed one at each side of the tang, and secured thereto by means of ferrules, in the manner hereinafter fully shown and described.

To enable those skilled in the art to fully understand and construct my invention, I will proceed to describe it.

A represents the blade of a knife, and B the tang, which is of flat form, equal in width to the handle. The handle is composed of two parts, C C, of equal length, width, and thickness, the width and length corresponding to that of the tang B. The parts C C of the handle are placed one at each side of the tang B, and are secured thereto by ferrules D D, which are fitted in recesses $a$ made in the parts C and in recesses $b$ made in the edges of the tang B. The recesses $b$, which receive one ferrule, are shown clearly in Fig. 4.

The ferrules D D are compressed in the recesses $a$ of the parts C C of the handle and in the recesses $b$ of the tang by means of dies, arranged in any suitable way. By thus compressing the ferrules they are not only made to grasp the parts C C of the handle and the tang B, but they are also made flush with the exterior of said parts. By this means the handle is firmly secured to the implement. The parts C C, which comprise the handle, cannot be drawn longitudinally off from the tang, in consequence of the ferrules D D fitting in the recesses $b$ in the edges of the tang B and in the recesses $a$ of the parts C C, and the ferrules also perform another important function—viz., they prevent said parts from splitting.

The parts C may be of wood or any of the materials used for such purpose, and may have rounded or polygonal outer surface, as desired. The invention prevents the handle being loosened and detached from the tang by immersion in warm water—a means very generally employed for cleaning cutlery, and which generally injures them, especially if cement be employed to secure the tangs in the handles.

Another advantage my invention possesses, and that is economy in construction, especially in the manufacture of the cheaper kinds of cutlery, for which my invention is more especially adapted.

Having thus described my invention, what I claim as new, and desire to secure by Letters Patent, is—

Forming handles for cutlery and implements pertaining or analogous thereto by means of the parts C C, secured to a flat tang B by means of ferrules D D, fitted and compressed in recesses $a\ b$ made respectively in said parts and the tang, substantially as herein set forth.

J. W. GARDNER.

Witnesses:
RUFUS SMITH,
HIRAM O. SMITH.